W. A. CAMPBELL.
ROPE SOCKET.
APPLICATION FILED JAN. 24, 1910.

997,488.

Patented July 11, 1911.

WITNESSES:
F. C. Fliedner
N. B. Keating

INVENTOR
W. A. Campbell
BY
F. M. Wright.
ATTORNEY

UNITED STATES PATENT OFFICE.

WILLIAM A. CAMPBELL, OF BAKERSFIELD, CALIFORNIA, ASSIGNOR OF ONE-HALF TO JOSEPH GOLDMAN, OF SAN FRANCISCO, CALIFORNIA.

ROPE-SOCKET.

997,488.              Specification of Letters Patent.     Patented July 11, 1911.

Application filed January 24, 1910. Serial No. 539,683.

*To all whom it may concern:*

Be it known that I, WILLIAM A. CAMPBELL, a citizen of the United States, residing at Bakersfield, in the county of Kern and State of California, have invented new and useful Improvements in Rope-Sockets, of which the following is a specification.

The object of the present invention is to provide a rope socket which shall be interchangeable for different kinds of tools.

It is especially adapted for connecting the rope to a hook for raising the sucker rods and tubing of oil wells, and also for the stems of jarring tools and cleaning out strings.

Figure 1:
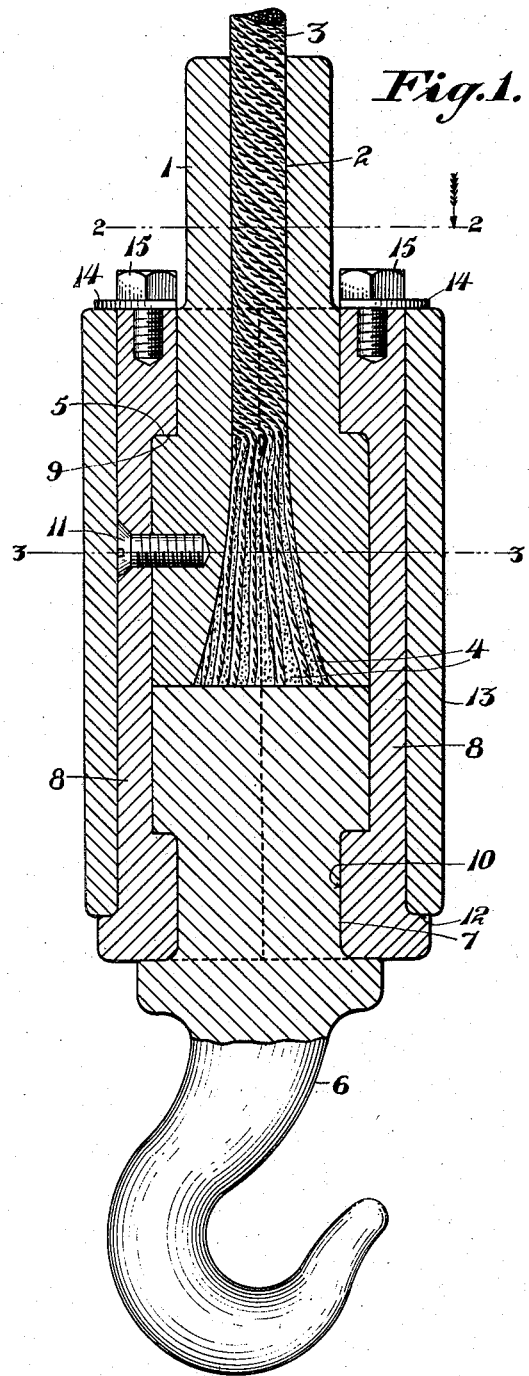
Figure 2:
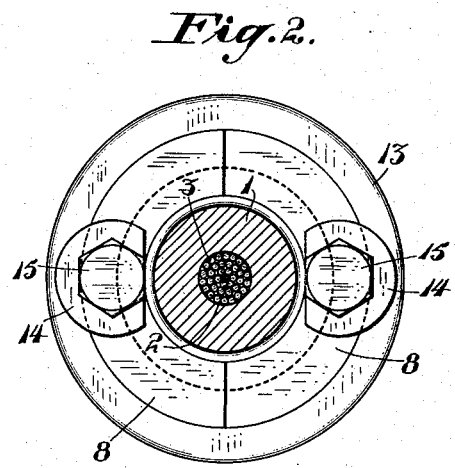
Figure 3:
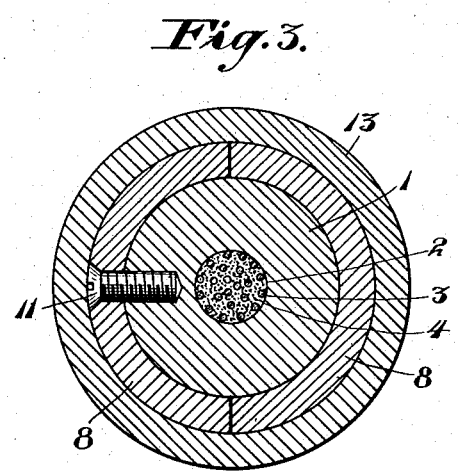

In the accompanying drawing, Figure 1 is a vertical section of the device; Fig. 2 is a horizontal section on the line 2—2 of Fig. 1; Fig. 3 is a similar section on the line 3—3 of Fig. 1.

Referring to the drawing, 1 indicates a socket proper, the aperture 2 of which is expanded at the lower portion. In said aperture is inserted the rope or cable 3, the strands of which are frayed out, and are secured in said aperture by means of Babbitt metal 4 or any suitable material cast or allowed to set therein. Said socket is formed with an upwardly facing exterior annular shoulder 5. 6 indicates the tool which is to be supported by said socket, which is here shown as a hook for attaching to the elevators or other devices for raising the sucker rods or tubing. Said hook is formed with an annular groove 7, the upper side of which forms a downwardly facing annular shoulder. Surrounding the lower portion of the socket and the upper portion of the tool are two semi-cylindrical sleeve sections 8 which when placed together form a sleeve having a downwardly facing shoulder 9 resting upon the shoulder 5, and the lower portion thereof being reduced in diameter, as shown at 10, to enter the groove 7. One of said sections is secured to the lower portion of the socket by a screw 11, and is not removed in ordinary use. The sleeve sections are formed near the lower end with an external shoulder 12 and surrounding said sleeve sections is a tube 13, slid over said sleeve sections when in place. It is retained against upward movement by two washers 14 which are secured by screws 15 to the sleeve sections and which extend over the upper end of the tube.

In operation, the hook is fitted in the sleeve section permanently secured to the socket, and then the other sleeve section is placed around the hook and socket, so that the parts 10 of the sleeve enter the groove 9 in the hook, and the shoulder in the upper portion of the sleeve 9 rests upon the shoulder 5 on the socket. The tube 13 is then passed longitudinally on to the sleeve, and the washers 14 are secured in place by the screws 15. The hook is removed by a reverse operation.

By this means it is possible, in use with an oil well, to remove the rods, remove the tubing, apply the string of cleaning tools to clean the well, then replace the tubing, and replace the rods, all with single line of rope.

I claim:—

In combination with a socket having a longitudinal aperture enlarged at the lower end, and having an upwardly facing external shoulder, sleeve sections having downwardly facing internal shoulders adapted to rest upon said shoulder, and upwardly facing internal shoulders adapted to engage a downwardly facing shoulder on a tool to be supported, said sections each having an upwardly facing external shoulder, a tube around said sections and resting against said external shoulders, and means for retaining said tube against upward movement on said sections, substantially as described.

In testimony whereof I have hereunto set my hand in the presence of two subscribing witnesses.

WILLIAM A. CAMPBELL.

Witnesses:
F. M. WRIGHT,
D. B. RICHARDS.